US012267011B2

(12) United States Patent
Cattani et al.

(10) Patent No.: US 12,267,011 B2
(45) Date of Patent: Apr. 1, 2025

(54) CIRCUIT FOR CONTROLLING CONVERTERS, CORRESPONDING CONVERTER DEVICE AND METHOD

(71) Applicant: STMicroelectronics S.r.l., Agrate Brianza (IT)

(72) Inventors: Alberto Cattani, Cislago (IT); Stefano Ramorini, Arluno (IT); Alessandro Gasparini, Cusano Milanino (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 696 days.

(21) Appl. No.: 17/122,132

(22) Filed: Dec. 15, 2020

(65) Prior Publication Data

US 2021/0099087 A1 Apr. 1, 2021

Related U.S. Application Data

(63) Continuation of application No. 16/406,834, filed on May 8, 2019, now Pat. No. 10,897,200.

(30) Foreign Application Priority Data

May 11, 2018 (IT) .......................... 102018000005280

(51) Int. Cl.
*H02M 3/158* (2006.01)
*H02M 3/156* (2006.01)
(52) U.S. Cl.
CPC .......... *H02M 3/158* (2013.01); *H02M 3/1566* (2021.05)
(58) Field of Classification Search
CPC .............................. H02M 3/158; H02M 3/1566

USPC ......................................................... 323/282
See application file for complete search history.

(56) References Cited

U.S. PATENT DOCUMENTS

| 5,731,731 | A | 3/1998 | Wilcox et al. | |
| 9,612,637 | B1* | 4/2017 | Hoffman | ............. H02M 3/1584 |
| 2003/0210020 | A1* | 11/2003 | Zhang | ................. H02M 3/1584 |
| | | | | 323/225 |

(Continued)

FOREIGN PATENT DOCUMENTS

JP          207124850 A        5/2007

OTHER PUBLICATIONS

IT Search Report and Written Opinion for IT Appl. No. 102018000005280 dated Jan. 18, 2019 (9 pages).

*Primary Examiner* — Emily P Pham
*Assistant Examiner* — Monica Mata
(74) *Attorney, Agent, or Firm* — Crowe & Dunlevy LLC (57) ABSTRACT

A half bridge converter is controlled by a circuit including a differential circuit receiving a reference signal and a feedback signal which is a function of an output signal from the converter. The half bridge includes hand and low side switches. A comparator generates a PWM signal for controlling the converter as a function of the duty cycle of the PWM signal in response to a signal at an intermediate node between the hand and low side switches and an output of the differential circuit. A gain circuit block coupled between the intermediate node and the input of the comparator applies a ramp signal to the input of the comparator which is a function of the signal at the intermediate node. A variable gain is applied by the gain circuit block in order to keep a constant value for the duty cycle of said PWM signal irrespective of converter operation.

9 Claims, 3 Drawing Sheets

(56) References Cited

U.S. PATENT DOCUMENTS

| | | | |
|---|---|---|---|
| 2008/0150368 A1* | 6/2008 | Gurcan | H02M 1/088 327/520 |
| 2012/0286752 A1 | 11/2012 | Tsukiji et al. | |
| 2014/0328091 A1* | 11/2014 | Sakakibara | H02M 1/15 363/37 |
| 2015/0008895 A1 | 1/2015 | Weng et al. | |
| 2017/0025947 A1* | 1/2017 | Wang | H02M 3/156 |
| 2017/0045596 A1* | 2/2017 | Driessen | H02M 7/537 |

* cited by examiner

CIRCUIT FOR CONTROLLING CONVERTERS, CORRESPONDING CONVERTER DEVICE AND METHOD

CROSS REFERENCE TO RELATED APPLICATIONS

This application is a continuation of U.S. application patent Ser. No. 16/406,834 filed May 8, 2019, which claims the priority benefit of Italian Application for Patent No. 102018000005280, filed on May 11, 2018, the contents of which are hereby incorporated by reference in their entireties to the maximum extent allowable by law.

TECHNICAL FIELD

The description relates to techniques for controlling converters.

One or more embodiments may be applied to converters relying on power partitioning, for example involving dynamic transistor control techniques. For instance, one or more embodiments may be applied to current-controlled DC/DC converters.

BACKGROUND

Converters such as DC/DC converters are a class of circuits widely used in many applications to generate the supply voltage levels required for the operation of sophisticated electronic systems, such as smart phones, laptops or other devices. A stable and precise supply voltage provided at the output of a converter may also facilitate matching the performance expected from such electronic systems.

In many applications, converters may be designed considering power efficiency, for example in order to reduce energy consumption.

For instance, low energy consumption of converters may facilitate increasing the operating life of battery-supplied electronic devices.

In the case of cable-powered devices, low energy consumption may be beneficial, for example, resulting in lower thermal stresses due to power dissipation in the device.

Satisfactory overall efficiency of converters may be sought by designing converter circuits that exhibit a low quiescent current in case the load coupled at the output of the converter is small.

On the other hand, high efficiency of converter circuits may be sought also in case the load coupled thereto is large, when a high output current capability may be involved.

It is noted that, in the framework of the present description, a small load is to be understood as a high-impedance load, therefore involving a low output current from the converter circuit, and a large load is to be understood as a low-impedance load, therefore involving a high output current from the converter circuit.

A possible solution for improving the power efficiency of converter circuits both in small output load conditions and in large output load conditions is partitioning of the power transistors, for example power MOS transistors, which are comprised in the power stage of the converter circuit. Techniques taking advantage of partitioning of power transistors in converters may be referred to as dynamic transistor control techniques.

Despite the extensive activity in the area, further improved solutions are desirable.

For instance, solutions are desirable which may facilitate, for example, providing smooth transitions between possible operating states of a converter relying on dynamic transistor control techniques, therefore providing an output regulated voltage of the converter which may be scarcely affected by such transitions.

Moreover, solutions are desirable which may facilitate compensating transitions between operating states of a converter relying on dynamic transistor control techniques for plural operating conditions of the converter, for example for different values of the input voltage, output voltage, output current, and/or operating temperature.

Another desirable feature is to provide compensation of the transitions of a converter relying on dynamic transistor control without affecting the value of the control voltage of the converter.

SUMMARY

One or more embodiments may provide a hardware solution for managing the transitions of a converter relying on dynamic transistor control techniques, operating compensation for different operating conditions of the converter.

In one or more embodiments, (voltage) compensation may be applied in a converter to the drain-source voltage sensed at power transistors in a half-bridge arrangement, thus providing a compensated signal whose contribution is independent from the size of the power transistors being operated in the half-bridge arrangement.

In one or more embodiments, the control signal of a converter may be kept fixed during transitions from one to another of the possible operating states of the half-bridge arrangement, for example due to operation of the converter involving dynamic transistor control.

One or more embodiments may thus facilitate reducing unwanted variations of the output regulated voltage of a converter involving dynamic transistor control.

One or more embodiments may be applicable to different kinds of converter topologies involving dynamic transistor control.

One or more embodiments may be applied, for example, to power management integrated circuits for converters for providing regulated power supply to AMOLED panels/displays.

In an embodiment, a circuit comprises: a differential circuit having a first input node configured to receive a reference (voltage) signal and a second input node configured to receive a feedback signal which is a function of an output signal from a converter device comprising a half-bridge arrangement of high-side electronic switches and low-side electronic switches; a comparator having a comparator output node configured to produce a PWM-modulated signal for controlling the converter device as a function of the duty cycle of the PWM-modulated signal, the comparator having a first input node coupled to an intermediate node between the high-side electronic switches and low-side electronic switches in the half-bridge arrangement, and a second input node coupled to an output node of the differential circuit.

A gain circuit is coupled between the intermediate node in the half-bridge arrangement and the first input node of the comparator, wherein the gain circuit block is configured to apply to the first input node of the comparator a ramp signal which is a function of the signal at the intermediate node in the half-bridge arrangement. The gain circuit block may comprise a variable-gain circuit block.

The gain circuit block may be configured to vary the gain of the gain circuit block as a function of a received at least one operating state signal indicative of an operating state of the half-bridge arrangement in the converter device.

The half-bridge arrangement in the converter device may comprise high-side and low-side electronic switches arranged in plural sets selectable in different activation options and the gain circuit block may be sensitive to an operating state signal indicative of the activation option of the high-side and low-side electronic switches that is selected. The gain circuit block is configured to vary the gain of the gain circuit block as a function of said operating state signal indicative of said activation option.

The gain circuit block may be configured to receive an input ramp signal, wherein the ramp signal applied to the first input node of the comparator by the gain circuit block is a linear combination of the signal at the intermediate node in the half-bridge arrangement and the input ramp signal.

The second input node of the differential circuit is coupled to the output node of the converter device and is sensitive to the output signal at the output node of the converter device. The first input node of the comparator is coupled to the intermediate node between high-side electronic switches and low-side electronic switches in the half-bridge arrangement, and the output node of the comparator is coupled to the half-bridge arrangement in the converter device to control the converter device as a function of the duty cycle of the PWM-modulated signal.

In an embodiment, a method is presented for operating the circuit by varying the gain of the gain circuit block by targeting a constant value for the duty cycle of the PWM-modulated signal.

With the half-bridge arrangement in the converter device comprising high-side and low-side electronic switches arranged in plural sets selectable in different activation options, a method comprises: changing operation of the converter device from one to another of the different activation options of said sets of high-side and low-side electronic switches, and varying the gain of said gain circuit block by keeping a constant value for the duty cycle of said PWM-modulated signal irrespective of operation of the converter device changing from one to another of the different activation options of said sets of high-side and low-side electronic switches in said half-bridge arrangement.

In an embodiment, a method comprises: generating an output signal from a converter device comprising a half-bridge arrangement of high-side and low-side electronic switches; deriving a feedback signal as a function of the output signal; determining a difference between a reference signal and the feedback signal to generate a control signal; generating a ramp signal as a function of a variable gain scaling of an intermediate signal at an intermediate node between the high-side and low-side electronic switches in said half-bridge arrangement; comparing the control signal to the ramp signal to generate a PWM-modulated signal; and controlling the high-side and low-side electronic switches in said half-bridge arrangement in response to said PWM-modulated signal.

BRIEF DESCRIPTION OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
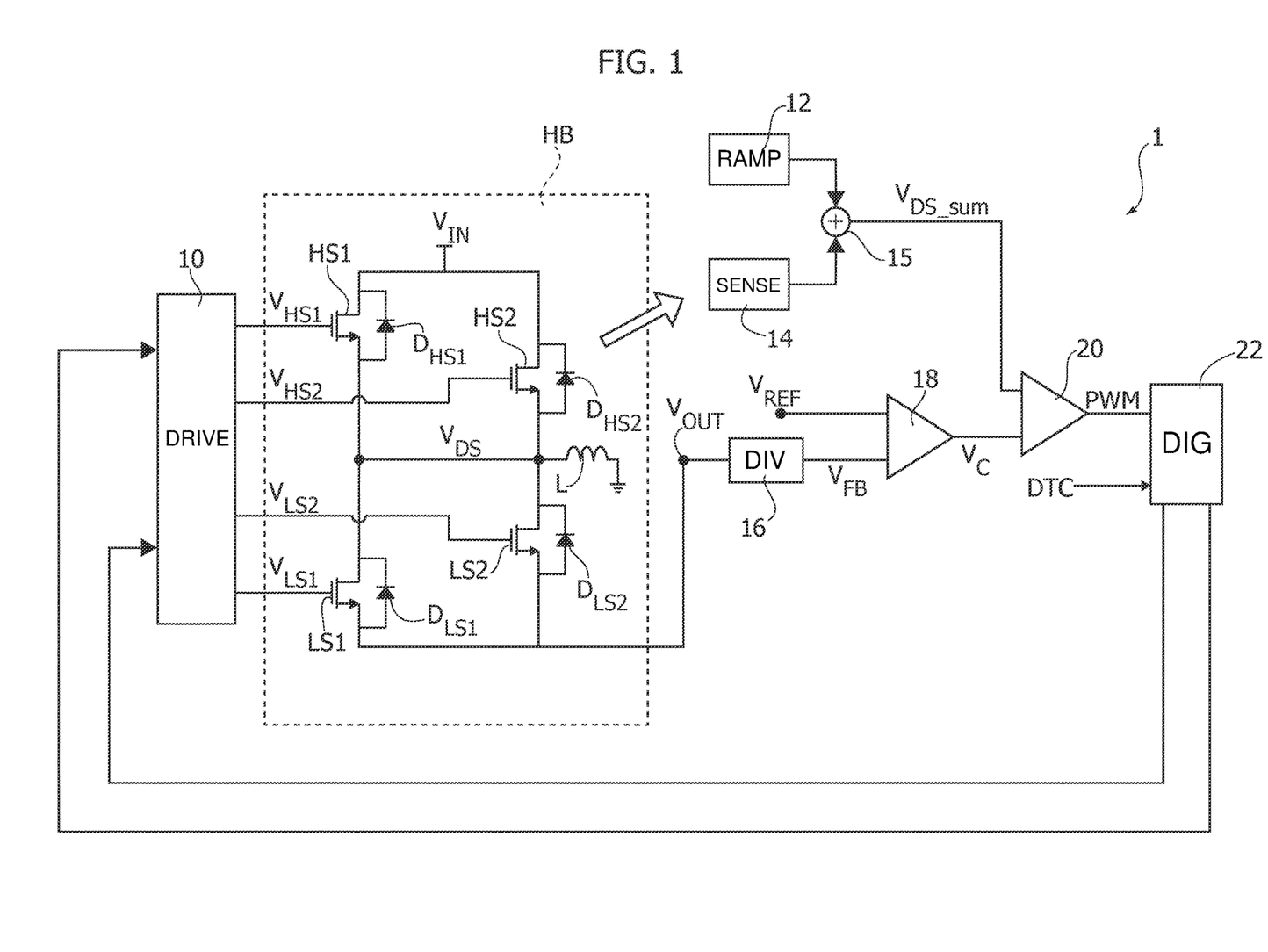
FIG. 1 is a diagram exemplary of a converter layout.

By way of introduction to a detailed description of exemplary embodiments, reference may be first had to FIG. 1. FIG. 1 is exemplary of a current-controlled feedback loop of a converter device 1, for example a DC/DC converter circuit, involving dynamic transistor control.

Also, while DC/DC converters will be referred to for simplicity throughout this description, it will be appreciated that one or more embodiments are not limited to DC/DC converters.

A DC/DC converter device as exemplified in FIG. 1 may comprise:
- a half-bridge arrangement HB, having an input node $V_{IN}$, control input nodes $V_{HS1}$, $V_{HS2}$, $V_{LS1}$, $V_{LS2}$, and an output node $V_{OUT}$,
- a ramp generator (RAMP) circuit block 12,
- a current sensing (SENSE) circuit block 14, coupled to a high-side transistor in the half-bridge arrangement HB,
- an adder node 15, adding up the output signals from the ramp generator circuit block 12 and the current sensing circuit block 14,
- a feedback (voltage) divider (DIV) circuit block 16, coupled to the output node $V_{OUT}$ of the half-bridge arrangement HB,
- a differential circuit 18, for example a differential amplifier, having a first input coupled to a reference voltage node $V_{REF}$ and a second input coupled to the output node $V_{FB}$ from the feedback (voltage) divider circuit block 16,
- a comparator 20, for example a voltage comparator, having a first input coupled to the output $V_{DS\_sum}$ of the adder node 15 and a second input coupled to the output node $V_C$ (control signal) of the differential circuit 18,
- a controller digital (DIG) circuit block 22, coupled to the output PWM of the comparator 20 and configured to receive a (logic) control signal DTC, and
- a high-side and low-side driver (DRIVE) circuit block 10, coupled to the output of the controller digital circuit block 22 and providing output signals $V_{HS1}$, $V_{HS2}$, $V_{LS1}$, $V_{LS2}$ at the inputs of the half-bridge arrangement HB.

A half-bridge arrangement HB comprised in a DC/DC converter device as exemplified in FIG. 1 may comprise at least two power transistors HS1, HS2, for example MOS field-effect transistors, having their current paths coupled between the input node $V_{IN}$ and an intermediate node $V_{DS}$, at least two power transistors LS1, LS2, for example MOS field-effect transistors, having their current paths coupled between the intermediate node $V_{DS}$ and the output node $V_{OUT}$, and an inductor L coupled between the intermediate node $V_{DS}$ and ground.

The power transistors HS1, HS2, LS1, LS2 in the half-bridge arrangement HB may have corresponding body diodes $D_{HS1}$, $D_{HS2}$, $D_{LS1}$, $D_{LS2}$. For instance, in case power transistors HS1, HS2, LS1, LS2 are n-channel MOS field-effect transistors as exemplified in FIG. 1, body diodes $D_{HS1}$, $D_{HS2}$, $D_{LS1}$, $D_{LS2}$ have cathodes coupled to the drain nodes of the respective transistors and anodes coupled to the source nodes of the respective transistors.

It will be appreciated that body diodes $D_{HS1}$, $D_{HS2}$, $D_{LS1}$, $D_{LS2}$, despite being represented as entities separated from their respective transistors HS1, HS2, LS1, LS2 for the sake of ease of illustration only, are in fact inherently present in the transistors HS1, HS2, LS1, LS2 as is known to the person skilled in the art.

It will also be noted that, while FIG. 1 is exemplary of a possible implementation of the half-bridge arrangement HB, other implementations of the half-bridge arrangement may be suitable as well, for example for realizing different converter topologies.

For instance, in one or more embodiments, the power transistors LS1, LS2 may have their current paths coupled between the intermediate node $V_{DS}$ and ground, and the inductor L may be coupled between the intermediate node $V_{DS}$ and the output node $V_{OUT}$.

In a circuit as exemplified in FIG. 1, power partitioning techniques may be involved in the operation of the half-bridge arrangement HB.

The high-side transistors HS1 and HS2 may have different dimensions, for example different width. For instance, the transistor HS2 may be twice as wide as transistor HS1. Similarly, also the low-side transistors LS1 and LS2 may have different dimensions, for example, the transistor LS2 may be twice as wide as transistor LS1.

Therefore, in case the load (not visible in FIG. 1) coupled to the output node $V_{OUT}$ of the DC/DC converter device 1 is small or no load is coupled thereto, the signals $V_{HS1}$, $V_{HS2}$, $V_{LS1}$, $V_{LS2}$ may be such that the half-bridge arrangement HB operates by using the (small) transistors HS1 and LS1 (only), for example for reducing the overall power consumption of the DC/DC converter device 1.

Conversely, in case the load coupled to the output node $V_{OUT}$ of the DC/DC converter device is large and a high output current capability may be involved, the signals $V_{HS1}$, $V_{HS2}$, $V_{LS1}$, $V_{LS2}$ may be such that the half-bridge arrangement HB operates by using the (wide) transistors HS2 and LS2 (only), for example for increasing the overall efficiency of the DC/DC converter device 1 by reducing the resistance $R_{ds}$ of the power transistors in the half-bridge HB.

Alternatively, in case the load coupled to the output node $V_{OUT}$ of the DC/DC converter device is large, the signals $V_{HS1}$, $V_{HS2}$, $V_{LS1}$, $V_{LS2}$ may be such that the half-bridge arrangement HB operates by using both high-side transistors HS1 and HS2, and both low side transistors LS1 and LS2, for example for further reducing the resistance $R_{ds}$ of the power transistors in the half-bridge HB and increasing the output current capability.

In a circuit as exemplified in FIG. 1, power partitioning may be obtained by using dynamic transistor control for switching between a first operating state of the DC/DC converter device, wherein the half-bridge HB operates by means of (small) transistors HS1 and LS1, a second operating state, wherein the half-bridge HB operates by means of (wide) transistors HS2 and LS2, and a third operating state, wherein the half-bridge HB operates by means of pairs of transistors HS1+HS2 and LS1+LS2. Therefore, dynamic transistor control techniques may provide different activation options for the high-side and low-side transistors in the half-bridge HB.

In converter devices as described above, transitions between operating states of the half-bridge arrangement HB may lead to unwanted variations of the output (voltage) signal $V_{OUT}$ that may induce issues, for example performance issues, for the load coupled to the output node $V_{OUT}$, for example an electronic device supplied by the DC/DC converter 1. For instance, such electronic device supplied by the DC/DC converter 1 and coupled to the output node $V_{OUT}$ may be, in one or more embodiments, an AMOLED display screen, or a similar device.

If no additional actions are taken, the output regulated voltage of the DC/DC converter 1 may be affected and/or disturbed as a result of a transition between operating states of the half-bridge arrangement HB.

Therefore, such DC/DC converter circuits using dynamic transistor control techniques may be configured to operate with a compensation in order to facilitate smooth transitions which may not generate variations of the output signal $V_{OUT}$ when switching between operating states of the half-bridge arrangement HB.

Figure 2A:
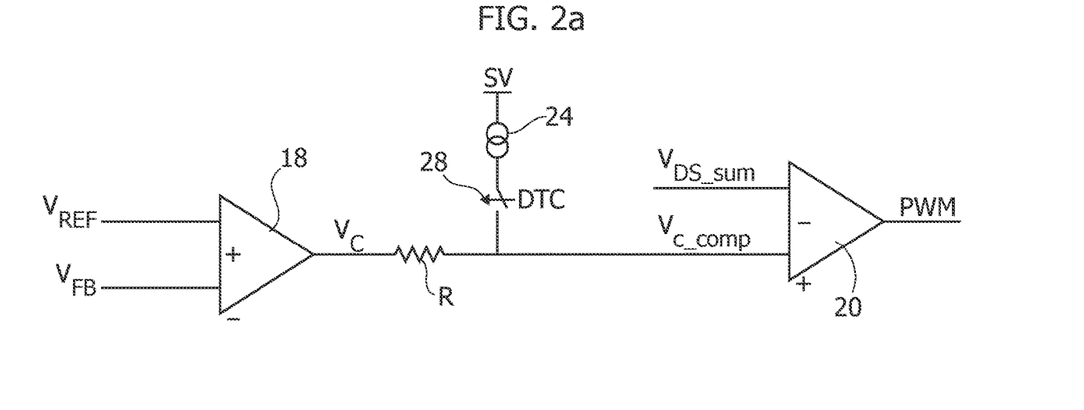
FIGS. 2a and 2b are exemplary of compensation and control circuits adapted for use in the layout of FIG. 1.
Figure 2B:
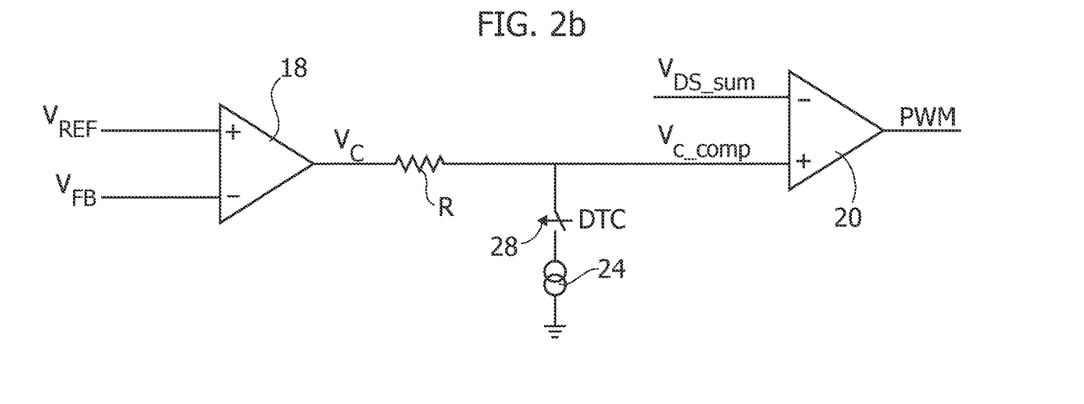

FIGS. 2a and 2b are exemplary of possible circuits which may facilitate applying compensation to the control signal $V_C$ in a DC/DC converter feedback loop and providing smooth transitions between operating states of the half-bridge arrangement HB.

Throughout the figures annexed herein, like parts or elements are indicated with like references/numerals and a corresponding description will not be repeated for brevity.

In a circuit as exemplified in FIG. 2a or FIG. 2b, the signal $V_C$ (for example, a voltage signal) provided at the output of the differential circuit 18 can be compensated before being fed to the comparator 20.

In a circuit as exemplified in FIG. 2a or in FIG. 2b, a resistor R has a first terminal coupled to the output node $V_C$ of the differential circuit 18, and a second terminal coupled to the second input of the comparator 20.

In a circuit as exemplified in FIG. 2a, a current generator 24 may be selectively coupled between a supply voltage rail SV and the second input of the comparator 20, such selective coupling being enabled by an electronic switch 28 triggered by a (logic) signal DTC.

Alternatively, in a circuit as exemplified in FIG. 2b, a current generator 24 may be selectively coupled between the second input of the comparator 20 and ground, such selective coupling being enabled by an electronic switch 28 triggered by a (logic) signal DTC.

In a circuit as exemplified in FIG. 2a or in FIG. 2b, the switch 28 being in a conductive state may result in a current, provided by the current generator 24, flowing through the resistor R, thus resulting in a voltage drop across the resistor R, such voltage drop being dependent on the value of the resistance of the resistor R and on the value of the current generated by the current generator 24.

Therefore, a signal $V_{C\_comp}$ at the second input of the comparator 20 may be different from the signal $V_C$ at the output of the differential circuit 18 as a result of the signal DTC triggering the activation of the switch 28.

It will be noted that circuits as exemplified in FIGS. 2a and 2b differ in that they may provide compensation of the signal $V_C$ with opposite signs. For instance, if operation of a circuit as exemplified in FIG. 2a may result in a signal $V_{C\_comp}$ which is higher than signal $V_C$, then operation of a circuit as exemplified in FIG. 2b may result in a signal $V_{C\_comp}$ which is lower than signal $V_C$.

Choosing the values of the resistor R and of the current generated by the current generator 24 may result in a variation of the compensated control signal $V_{C\_comp}$, due to the activation of the switch 28, which is adapted to match a variation of the signal $V_{DS\_sum}$ in case of a transition of the half-bridge arrangement HB from one to another of its possible operating states.

As a result of such compensation of the control signal $V_C$ of a DC/DC converter when the converter switches between operating states, the duty cycle of the signal PWM may be unaffected and the output signal $V_{OUT}$ of the DC/DC converter 1 may not show (relevant) changes.

Figure 3:
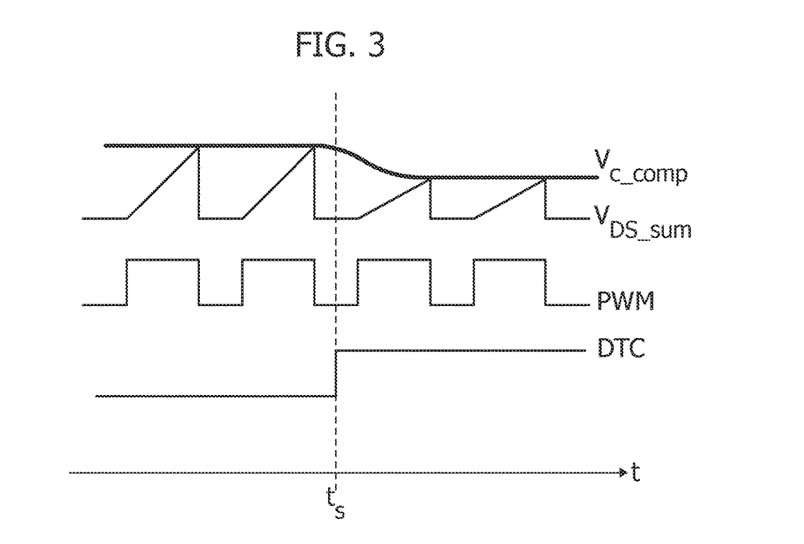
FIG. 3 is exemplary of possible time behavior of signals in the circuits of FIGS. 2a and 2b.

FIG. 3 is exemplary of possible time behavior of signals $V_{C\_comp}$, $V_{DS\_sum}$, PWM and DTC in a circuit as exemplified in FIG. 2a or 2b.

At a certain time $t_S$, the DC/DC converter may switch from an operating state (for example, operating transistors HS1 and LS1 in the half-bridge arrangement HB) to another operating state (for example, operating transistors HS2 and LS2, or operating pairs of transistors HS1+HS2 and LS1+LS2).

Such change of the operating state of the half-bridge HB may result in a different time behavior of the signal $V_{DS\_sum}$, for example a smaller amplitude of the signal $V_{DS\_sum}$ due to the smaller resistance $R_{ds}$ of transistors HS2, LS2 with respect to the resistance $R_{ds}$ of transistors HS1, LS1 (or, alternatively, due to the smaller resistance $R_{ds}$ of transistors HS1+HS2 and LS1+LS2 with respect to the resistance $R_{ds}$ of transistors HS1 and LS1 alone).

Compensating the control signal $V_C$ in order to produce a compensated control signal $V_{C\_comp}$ by triggering the (logic) signal DTC may facilitate keeping a constant duty-cycle of the signal PWM, thus resulting in a constant output signal $V_{OUT}$, for example a constant output regulated voltage.

A circuit as exemplified in FIG. 2a or FIG. 2b may have several drawbacks. For instance, since the amount of voltage compensation on the signal $V_C$ is related to the voltage drop across the resistor R, the compensation can be optimized only for a certain operating condition of the DC/DC converter device 1, for example only for a certain combination of the values of the parameters $V_{IN}$, $V_{OUT}$, $I_{LOAD}$ (output current provided to the load), temperature, etc.

Moreover, in a circuit as exemplified in FIG. 2a or FIG. 2b, voltage compensation can improve performance, but it may also be a source of deterioration of the overall performance of the DC/DC converter device in some operating conditions.

As a further drawback, long and accurate simulations may be required to correctly set the compensation current (that is, the current provided by the current generator 24). Moreover, the value of such compensation current may also depend on parasitic resistances and capacitances (not visible in FIGS. 2a and 2b), thus making it even more difficult to set its value.

Furthermore, the control signal $V_C$ is a critical signal of the DC/DC converter 1, and other kind of compensations may already be performed on such signal. Thus, operating a compensation for transitions due to dynamic transistor control at the node $V_C$ may induce noise injection or other issues in a DC/DC converter device.

Figure 4:
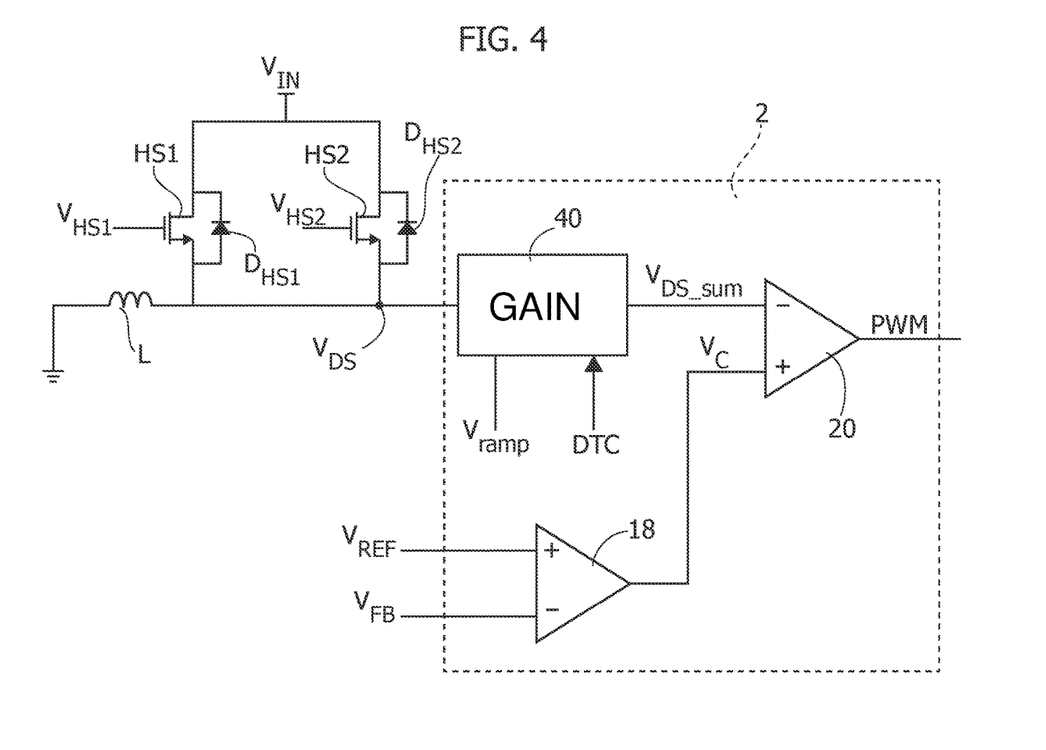
FIG. 4 is exemplary of a possible circuit architecture.

FIG. 4 is representative of a possible circuit architecture. A circuit 2 as exemplified in FIG. 4 may comprise:
a differential circuit 18, for example a differential amplifier, having a first input coupled to a reference voltage node $V_{REF}$ and a second input coupled to the output $V_{FB}$ from a feedback (voltage) divider circuit block 16 (not visible in FIG. 4),
a gain (GAIN) circuit block 40, for example a variable-gain circuit block, having a first input coupled to the intermediate node $V_{DS}$ of a half-bridge arrangement HB (not visible in FIG. 4) and, optionally, a second input coupled to a ramp generator providing a signal $V_{ramp}$, so that the output signal $V_{DS\_sum}$ may in fact correspond to the sum of the signal $V_{ramp}$ and of the signal $V_{DS}$, the latter being scaled by the gain applied by the gain circuit block 40, and
a comparator 20, for example a voltage comparator, having a first input coupled to the output $V_{DS\_sum}$ of the gain circuit block 40 and a second input coupled to the output $V_C$ of the differential circuit 18, providing an output signal PWM to a controller digital circuit block 22 (not visible in FIG. 4).

It will be noted that the first terminal of the inductor L exemplified in FIG. 4 is coupled to ground, coherently with the exemplary FIG. 1. Nevertheless, such coupling of the inductor L to ground is merely by way of example, and other configurations of the half-bridge circuit HB are possible, as previously noted, for example for realizing different converter topologies.

A (voltage) compensation circuit as exemplified in FIG. 4 may not alter the control signal $V_C$ of a DC/DC converter circuit. Instead, such compensation circuit may introduce a gain circuit block 40, for example a variable-gain circuit block, in the signal path from node $V_{DS}$ to node $V_{DS\_sum}$ of the DC/DC converter feedback loop.

Since the signal $V_{DS}$ may be related to the current flowing in the inductor L of the converter, operating a compensation in the signal path from node $V_{DS}$ to node $V_{DS\_sum}$ may also facilitate controlling the inductor current peaks of the DC/DC converter.

One or more embodiments may involve managing the transitions of a DC/DC converter relying on dynamic transistor control in order to keep a constant duty cycle of the signal PWM in case the half-bridge HB switches from one to another of its possible operating states, for example from the operation of the (small) transistors HS1 and LS1 to the operation of the (wide) transistors HS2 and LS2 or to the operation of pairs of transistors HS1+HS2 and LS1+LS2, thus facilitating providing a stable output signal $V_{OUT}$.

Figure 5:
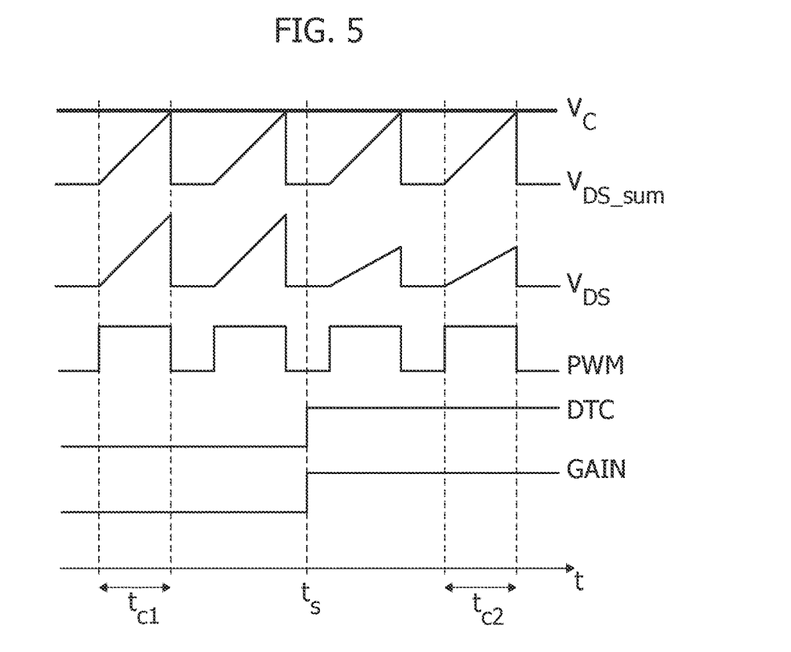
FIG. 5 is exemplary of possible time behavior of signals.

FIG. 5 is exemplary of possible time behavior of signals in the circuit as exemplified in FIG. 4.

In one or more embodiments, a low logic value (for example, "0") of the signal DTC (see FIG. 5, $t<t_s$) may be indicative, for instance, that the half-bridge HB in the DC/DC converter 1 operates with the high-side (small) transistor HS1 and the low-side (small) transistor LS1, while transistors HS2 and LS2 are kept inactive.

Operation of the half-bridge HB with transistors HS1 and LS1 may result in a signal $V_{DS}$ as exemplified in FIG. 5 when $t<t_s$, wherein the slope of the signal $V_{DS}$ is dependent on the current flowing in the inductor L and on the drain-source resistance $R_{ds}$ of the transistors HS1 and LS1.

In such condition, the variable gain block 40 may have a gain equal to 1, resulting in the output signal $V_{DS\_sum}$ being equal to the sum of the input signal $V_{DS}$ and of the ramp signal $V_{ramp}$. The signal $V_{DS\_sum}$, which is used to close the control loop of the converter, may thus reach the value of the control signal $V_C$ in a certain time interval $t_{c1}$. Such time interval $t_{c1}$ may therefore determine the duty cycle of the signal PWM.

In one or more embodiments, at a certain time $t_s$ the converter may operate with a transition to another operating state, for example an operating state wherein the half-bridge HB operates with the high-side (wide) transistor HS2 and the low-side (wide) transistor LS2, while transistors HS1 and LS1 are kept inactive (see FIG. 5, $t>t_s$).

For instance, transistor HS2 may be twice as wide as transistor HS1, the same applying to transistors LS2 and LS1. As a result, the drain-source resistance $R_{ds}$ of transistor HS2 may be about a half of the drain-source resistance of transistor HS1, the same applying to transistors LS2 and LS1.

Therefore, in case the output current provided by the DC/DC converter to the load is kept constant at the previous value, after such transition of the converter the signal $V_{DS}$ may have a different slope, for example about a half of the previous slope.

In case no action is performed, such reduced slope of the signal $V_{DS}$ would result in a change of the duty cycle of the signal PWM, since falling edges of the signal PWM are triggered by the comparator 20 as a result of the signal $V_{DS}$ reaching the control signal $V_C$. A change of the duty cycle of the signal PWM would generate an unwanted change of the output signal $V_{OUT}$ of the DC/DC converter.

Solutions as exemplified in FIGS. 2a and 2b are configured to compensate a change of the slope of the signal $V_{DS}$ by changing the value of the control signal $V_C$ in order to restore the expected duty cycle of the signal PWM.

In one or more embodiments as exemplified in FIG. 4, instead, an expected duty cycle of the signal PWM may be restored without affecting the control signal $V_C$, by providing a possibility to introduce a variable gain in the signal path from node $V_{DS}$ to node $V_{DS\_sum}$.

For instance, in one or more embodiments, a (variable) gain circuit block 40 may produce an output signal $V_{DS\_sum}$ wherein the contribution of the input signal $V_{DS}$ to the output signal $V_{DS\_sum}$ is dependent on the value of the gain GAIN of the (variable) gain circuit block 40, as exemplified in FIG. 5.

For instance, when DTC=0 and the half-bridge arrangement HB operates with the set of transistors HS1, LS1 (see FIG. 5, $t<t_s$), then GAIN=1, while when DTC=1 and the half-bridge arrangement HB operates with the set of transistors HS2, LS2 (see FIG. 5, $t>t_s$), then GAIN=2.

In general, the gain circuit block 40 may introduce a variable gain GAIN in the signal path from node $V_{DS}$ to node $V_{DS\_sum}$, the value of GAIN being dependent on the value of at least one (logic) control signal DTC, in order to facilitate compensating variations of the signal $V_{DS}$ and generating a signal $V_{DS\_sum}$ whose amplitude is independent from the operating state of the half-bridge HB, for example from the dimensions and/or number of the power transistors being operated in the half-bridge HB.

For example, as exemplified in FIG. 5, when $t>t_s$ the variable gain block 40 may have a gain equal to 2, resulting in the output signal $V_{DS\_sum}$ being equal to the sum of the input signal $V_{DS}$, scaled by a factor 2, and of the ramp signal $V_{ramp}$. Therefore, the signal $V_{DS\_sum}$ may reach the value of the control signal $V_C$ in a certain time interval $t_{c2}$ which is equal to the previous time interval $t_{c1}$, thus resulting in the same duty cycle of the signal PWM.

In one or more embodiments, a ramp signal $V_{ramp}$ may be provided by a ramp generator circuit similar to the ramp generator circuit block 12 exemplified in FIG. 1.

It will be noted that, while low ("0") and high ("1") logic values of the signal DTC have been used herein for indicating operating states of the DC/DC converter involving a low gain and a high gain, respectively, a complementary choice may be performed as well.

It will also be noted that, while referring herein to the possible values 1 and 2 for the parameter GAIN in the case of transistors HS1 and HS2 (as well as LS1 and LS2) having drain-source resistances approximately equal to $R_{ds}$ and $R_{ds}/2$, respectively, the value of the parameter GAIN can be varied in order to compensate other possible choices of the dimensions of the transistors HS1, HS2, LS1, LS2.

It will also be noted that, in one or more embodiments, plural operating states of the half-bridge circuit HB may be provided. For instance, the half-bridge circuit HB may comprise a plurality of high-side transistors HS1, HS2, ..., HSn and a plurality of low-side transistors LS1, LS2, ..., LSn having different dimensions, so that at least n possible operating states (each one relying on the operation of certain sets of high-side transistors and low-side transistors) can be provided.

In one or more embodiments, as already noted, operating states of the half-bridge circuit HB may also correspond to the operation of a plurality of high-side transistors and a plurality of low-side transistors. For instance, in a half-bridge circuit provided with two high-side transistors HS1, HS2 and two low-side transistors LS1, LS2, an operating state for use in the condition of high load coupled to the output may rely on the operation of both high-side transistors HS1, HS2 in parallel, and both low-side transistors LS1, LS2 in parallel. Values for the parameter GAIN of the (variable) gain circuit block 40 may be calculated accordingly.

Therefore, in a half-bridge circuit HB comprising a plurality of high-side transistors HS1, HS2, ..., HSn and a plurality of low-side transistors LS1, LS2, ..., LSn, more than n operating states are possible, due to the possibility of defining sets of transistors working in parallel.

Such plurality of possible operating states of a DC/DC converter device 1 may facilitate adapting the overall power efficiency to different loads coupled to the DC/DC converter.

In such case, the parameter GAIN may assume plural values so to facilitate compensating the signal $V_{DS}$ for a plurality of operating states. Similarly, the logic signal DTC may assume at least n different values, for example being encoded with more than 1 bit.

In one or more embodiments, the signal $V_{DS\_sum}$ may have an amplitude which is independent from the operating condition of the DC/DC converter device, resulting in the possibility of obtaining an expected duty cycle of the signal PWM for different operating conditions of the DC/DC converter device without changing the value of the control signal $V_C$.

Such stability of the duty cycle of the signal PWM during transitions of a DC/DC converter relying on dynamic transistor control for improved power efficiency may result in a stable output signal $V_{OUT}$, for example an output regulated voltage.

It will be noted that the present description may apply to different kinds of DC/DC converter topologies using a current-controlled loop with a power partitioning system.

One or more embodiments as exemplified in FIG. 4 may provide a number of advantages.

For instance, the possibility of varying the value of the parameter GAIN with continuity facilitates providing a satisfactory compensation for different operating conditions of the DC/DC converter, such as different input voltages $V_{IN}$, output voltages $V_{OUT}$, output currents $I_{LOAD}$, temperatures, etc.

Another advantage of one or more embodiments is the possibility of performing compensation without affecting the control signal $V_C$, which is notionally a critical signal of a DC/DC converter.

It will otherwise be appreciated that a (voltage) gain stage may be already present in some DC/DC converters depending on the topology and on the type of control loop, for example because the signal $V_{DS}$ is not referred to a fixed voltage node, so that one or more embodiments may be particularly advantageous in that they may involve a negligible increase of silicon area and power consumption of the converter circuit.

Moreover, in one or more embodiments the design and optimization process of the gain circuit block 40 may be facilitated by being related (only) to the power partitioning design constraints of transistor HS1, HS2, LS1, LS2, for example the dimensions of such transistors.

A circuit (for example, 2) according to one or more embodiments may comprise:
 a differential circuit (for example, 18) having a first input node configured to receive a reference (voltage) signal (for example, $V_{REF}$) and a second input node configured to receive a feedback signal (for example, $V_{FB}$) which is a function of the output signal (for example, $V_{OUT}$) from a converter device (for example, 1) comprising a half-bridge arrangement (for example, HB) of high-side electronic switches (for example, HS1, HS2) and low-side electronic switches (for example, LS1, LS2), the differential circuit having an output node,
 a comparator (for example, 20) having a comparator output node configured to produce a PWM-modulated signal (for example, PWM) for controlling (for example, 22, 10) the converter device as a function of the duty cycle of the PWM-modulated signal, the comparator having a first input node (for example, $V_{DS\_sum}$) configured to be coupled to a node (for example, $V_{DS}$) intermediate high-side electronic switches and low-side electronic switches in the half-bridge arrangement in the converter device, and a second input node (for example, $V_C$) coupled to the output node of the differential circuit.

One or more embodiments may comprise a gain circuit block (for example, 40) coupled between the intermediate node in the half-bridge arrangement and the first input node of the comparator, the gain circuit block configured to apply to the first input node of the comparator a ramp signal which is a function of the signal at the intermediate node in the half-bridge arrangement, wherein the gain circuit block may comprise a variable-gain circuit block.

In one or more embodiments, the gain circuit block may be configured to receive at least one operating state signal (for example, DTC) indicative of an operating state of the half-bridge arrangement in the converter device and vary the gain of the gain circuit block as a function of the at least one operating state signal.

In one or more embodiments, the half-bridge arrangement in the converter device may comprise high-side and low-side electronic switches (for example, HS1, LS1; HS2, LS2) arranged in plural sets activatable in different activation options (for instance: HS2, LS2 in the place of HS1, LS1; HS2+HS1, LS2+LS1 in the place of HS1, LS1; and so on) and the gain circuit block may be sensitive to an operating state signal (for example, DTC) indicative of the activation option of high-side and low-side electronic switches activated out of said different activation options, the gain circuit block being configured to vary the gain of the gain circuit block as a function of said operating state signal indicative of said activation option.

In one or more embodiments, the gain circuit block may be configured to receive an input ramp signal (for example, $V_{ramp}$), wherein the ramp signal applied to the first input node of the comparator by the gain circuit block is a linear combination of the signal at the intermediate node in the half-bridge arrangement and the input ramp signal.

A converter device (for example, 1) according to one or more embodiments may comprise:
 a half-bridge arrangement (for example, HB) comprising high-side electronic switches and low-side electronic switches having an intermediate node therebetween, the converter device comprising an output node configured to provide the output signal (for example, $V_{OUT}$) from the converter device and drive nodes (for example, $V_{HS1}$, $V_{HS2}$, $V_{LS1}$, $V_{LS2}$) coupled to high-side electronic switches and low-side electronic switches in the half-bridge arrangement,
 a circuit (for example, 2) according to one or more embodiments arranged with:
 a) the second input node of the differential circuit coupled (for example, 16) to the output node of the converter device and sensitive to the output signal at the output node of the converter device, and
 b) the first input node of the comparator coupled to a the intermediate node between high-side electronic switches and low-side electronic switches in the half-bridge arrangement, and the output node of the comparator coupled to the half-bridge arrangement in the converter device to control the converter device as a function of the duty cycle of the PWM-modulated signal.

According to one or more embodiments, a method of operating a circuit according to one or more embodiments or a converter device according to one or more embodiments may comprise varying the gain of the gain circuit block by targeting a constant value for the duty cycle of the PWM-modulated signal.

A method according to one or more embodiments may comprise, with the half-bridge arrangement in the converter device comprising high-side and low-side electronic switches arranged in plural sets activatable in different activation options:
 changing operation of the converter device from one to another of the different activation options of said sets of high-side and low-side electronic switches, and
 varying the gain of said gain circuit block by keeping a constant value for the duty cycle of said PWM-modulated signal irrespective of operation of the converter device changing from one to another of the different activation options of said sets of high-side and low-side electronic switches in said half-bridge arrangement.

Without prejudice to the underlying principles, the details and embodiments may vary, even significantly, with respect to what has been described by way of example only, without departing from the extent of protection.

The extent of protection is defined by the annexed claims. The claims are an integral part of the technical teaching provided herein in respect of the embodiments.

The invention claimed is:

1. A method, comprising:
    generating an output signal from a converter device comprising a first half-bridge arrangement of first high-side and first low-side electronic switches driven by first drive signals and a second half-bridge arrangement of second high-side and second low-side electronic switches driven by second drive signals;
    deriving a feedback signal as a function of the output signal;
    determining a difference between a reference signal and the feedback signal to generate a control signal;
    generating a ramp signal;
    generating an intermediate signal at an intermediate node between the high-side and low-side electronic switches in the half-bridge arrangement;
    applying a gain scaling to the intermediate signal to generate a gain scaled intermediate signal;
    summing the ramp signal and the gain scaled intermediate signal to generate a summed signal;
    comparing the control signal to the summed signal to generate a PWM-modulated signal;
    controlling the first and second high-side switches and first and second low-side electronic switches in the half-bridge arrangement in response to the PWM-modulated signal;
    in response to a change in operating state from using the first half-bridge arrangement to using the second half bridge arrangement, changing the gain scaling from a first gain value to a second gain value; and
    in response to a change in operating state from using the second half-bridge arrangement to using the first half bridge arrangement, changing the gain scaling from the second gain value to the first gain value.

2. The method of claim 1, further comprising:
    receiving an operating state signal indicative of the operating state; and
    varying the gain value of the gain scaling applied to the intermediate signal as a function of a change in the operating state signal.

3. The method of claim 2, wherein the operating state signal is indicative of selecting use of the first half-bridge arrangement and selecting use of the second half-bridge arrangement.

4. The method of claim 3, wherein the first and second gain values are selected so as to keep a constant value for a duty cycle of the PWM-modulated signal irrespective of change in operating state.

5. The method of claim 1, wherein the first and second gain values are selected in order to target a constant value for a duty cycle of the PWM-modulated signal irrespective of change in operating state.

6. A method, comprising:
    generating an output signal from a converter circuit comprising a first half-bridge circuit and a second half-bridge circuit that share a common intermediate node and a common output node, wherein the converter circuit is configurable for operation in a plurality of operating states including a first state where the first half-bridge circuit is active and the second half-bridge circuit is inactive and a second state where the first half-bridge circuit is inactive and the second half-bridge circuit is active;
    deriving a feedback signal as a function of the output signal;
    determining a difference between a reference signal and the feedback signal to generate a control signal;
    generating a ramp signal;
    generating an intermediate signal at the common intermediate node between high-side and low-side electronic switches in the half-bridge arrangement;
    applying a gain scaling to the intermediate signal to generate a gain scaled intermediate signal;
    summing the ramp signal and the gain scaled intermediate signal to generate a summed signal;
    comparing the control signal to the summed signal to generate a PWM-modulated signal;
    controlling the first and second half-bridge circuits in response to the PWM-modulated signal;
    changing from the first state to the second stage and selecting a first gain value for the gain scaling; and
    changing from the second state to the first state and selecting a second gain value, different from the first gain value, for the gain scaling.

7. The method of claim 6, wherein controlling comprises driving the high-side and low-side electronic switches with control signals derived from the PWM-modulated signal, and further comprising:
    receiving a change in an operating state signal; and
    changing the gain value of the gain scaling in response to the change in the operating state signal.

8. The method of claim 6, wherein the first and second gain values are selected in order to target a constant value for a duty cycle of the PWM-modulated signal irrespective of change between the first and second states.

9. The method of claim 6, wherein transistors of the first half-bridge circuit are smaller than transistors of the second half-bridge circuit.

* * * * *